United States Patent [19]

Stevenson, Jr.

[11] 4,125,845

[45] Nov. 14, 1978

[54] INK JET PRINT HEAD PRESSURE AND TEMPERATURE CONTROL CIRCUITS

[75] Inventor: Richard G. Stevenson, Jr., Palo Alto, Calif.

[73] Assignee: Silonics, Inc., Sunnyvale, Calif.

[21] Appl. No.: 827,564

[22] Filed: Aug. 25, 1977

[51] Int. Cl.$^2$ ............................................ G01D 15/16

[52] U.S. Cl. .................................. 346/140 R; 73/708; 219/496; 219/499; 323/75 A

[58] Field of Search ................. 346/140 R; 323/75 A, 323/75 B, 75 N; 219/496, 499; 73/708

[56] References Cited

U.S. PATENT DOCUMENTS

| | | | |
|---|---|---|---|
| 3,429,178 | 2/1969 | Durbin | 323/75 A X |
| 3,946,398 | 3/1976 | Kyser | 346/140 R X |
| 3,967,188 | 6/1976 | Spencer | 323/75 B |

FOREIGN PATENT DOCUMENTS

| | | | |
|---|---|---|---|
| 1,012,198 | 6/1977 | Canada | 346/140 R X |

*Primary Examiner*—Joseph W. Hartary
*Attorney, Agent, or Firm*—Limbach, Limbach & Sutton

[57] ABSTRACT

An electronic circuit for sensing and controlling the pressure and temperature of ink within an ink jet print head. Ink pressure is monitored by a pair of strain gauges electrically connected into a bridge whose output controls an ink supply valve. Part of that bridge is utilized with additional elements to form a second bridge for monitoring through one of the strain gauges the temperature of the ink jet head, accompanied with a heater of the head that is driven from the temperature signal to maintain the head temperature above a preset temperature.

9 Claims, 3 Drawing Figures

INK JET PRINT HEAD PRESSURE AND TEMPERATURE CONTROL CIRCUITS

BACKGROUND OF THE INVENTION

This invention relates generally to the art of non-impact ink jet printing, and more particularly to ink pressure and temperature monitoring and control techniques for ink jet print heads.

Ink jet heads of the asynchronous type are described in U.S. Pat. No. 3,946,398 — Kyser, et al. (1976), and co-pending patent applications Ser. No. 489,985, filed July 19, 1974, Ser. No. 694,064, filed June 7, 1976 and Ser. No. 807,219, filed June 16, 1977, all assigned to the assignee of the present application. In such an ink jet head, a piezoelectric crystal is associated with an ink jet chamber in a manner that when the crystal is supplied a high voltage pulse it rapidly reduces the volume of the ink jet chamber, resulting in ejecting a droplet of ink from an orifice with sufficient velocity for it to travel to a recording medium. One such droplet forms a small portion of a character to be printed. A plurality, such as seven or nine, of such chambers are preferably constructed as a single print head that is mechanically swept line-by-line across a recording medium upon which the printing is taking place. At each column of the printing line, the appropriate number of the independently controllable ink jet chambers are fired by pulsing their respective piezoelectric crystals to eject ink drops therefrom.

As described in the aforementioned co-pending patent applications, such a multiple channel print head preferably includes a common ink pulse chamber from which ink is supplied to each of the individual chambers. A source of ink is supplied under pressure to the pulse chamber through an electrically controlled valve. The pressure of the ink within the pulse chamber is monitored by a strain gauge connected to a mechanical beam that moves in direct porportion to changes of pressure within the pulse chamber. A second strain gauge is passively attached to a surface of the head. The two strain gauges are electrically connected in a bridge arrangement so that temperature variations do not significantly affect the pressure reading obtained. A signal proportional to the ink pressure is then utilized to open the ink supply valve when the pressure goes below a predetermined threshold and, conversely, to close the valve when the pressure goes above a certain threshold. In this way, the ink supply pressure to the individual channels is maintained within limits which aids in keeping the channels operating properly to eject droplets of ink when called upon to do so.

It is a principle object of the present invention to provide an improved ink pulse chamber pressure sensing circuitry, particularly circuitry that is less sensitive to extraneous induced noise.

It is also an important object of the present invention to provide a temperature sensing and control system for the print head in order that its temperature variation is maintained within a predetermined range, thereby to optimize the operation of the print head and improve its reliability.

SUMMARY OF THE INVENTION

Briefly, these and additional objects are accomplished by the present invention wherein active and passive strain gauges of the ink jet head are connected in a bridge arrangement wherein the circuitry receiving the bridge output for controlling the valve automatically cancels any extraneous noise induced in the electrical system. This is desirable since several feet of wire may connect the strain gauges of the print head with electronic processing circuitry. Constant current source circuits are optionally included in the non-strain gauge legs of the bridge in order to increase the sensitivity of the measuring system. The passive strain gauge of the head is also utilized for a second purpose of measuring the print head temperature. The temperature reading is utilized to drive an electrical heater which is preferably formed as a resistance element on one surface of the print head. By using the passive strain gauge for both pressure and temperature measurements, an extra temperature sensor is avoided as well as the necessity to run additional leads from the moving head to the stationary processing circuitry.

The principal features of the present invention have been briefly outlined but other features, objects and advantages of the various aspects of the present invention are given in the following description of its preferred embodiments which should be taken in conjunction with the accompanying drawings.

DESCRIPTION OF THE PREFERRED EMBODIMENTS

Figures 1, 2, 3:
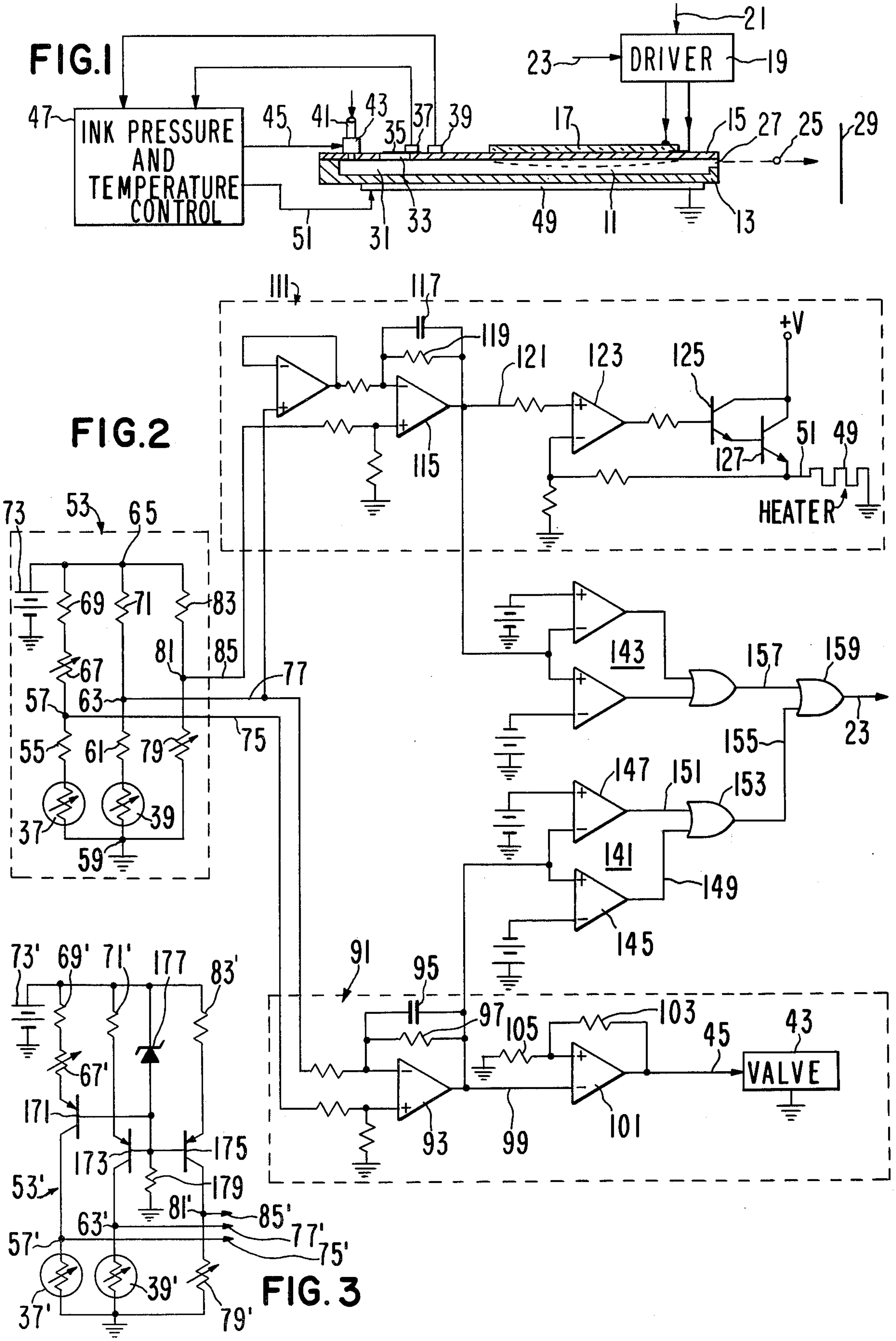
FIG. 1 illustrates in cross section a typical ink jet print head with the temperature and pressure sensing and control elements indicated generally.
FIG. 2 is a schematic diagram of a preferred temperature and pressure measurement and control circuitry for the print head of FIG. 1 and utilizing the various aspects of the present invention.
FIG. 3 is an alternative bridge circuit to that of FIG. 2 and which further utilizes an additional aspect of the present invention.

Referring to FIG. 1, the overall structure of an ink jet printing head with which the circuits of the present invention are utilized will be generally explained. An ink chamber 11 is formed of an etched bottom plate 13 and a thin top plate 15. Adhered to the top plate 15 is a piezoelectric crystal 17. The crystal 17 is energized through an associated driver circuit 19 in accordance with printing signals obtained in an input line 21 unless the driver 19 is disabled by an appropriate control signal in a line 23. When the crystal 17 is pulsed by the driving circuits, it causes the top plate 15 to deflect downward into the chamber 11 in a manner shown in dotted outline in FIG. 1. When this deflection occurs with sufficient energy, an ink droplet 25 is ejected from a nozzle 27 to a writing medium 29 such as paper for forming one dot of a character to be printed thereon.

The principal application for such an ink jet print head is in forming alpha-numeric characters line-by-line on a printing medium as an alternative to existing impact printer techniques. Several independently controllable ink jet channels are preferably combined into a single printing head so that a complete line of characters can be formed in a single pass of the print head across the writing medium. A plurality of ink jet channels, such as seven or nine conforming to existing dot matrix standards, can be formed in a column that is swept across the writing medium, for example. The physical structure of such ink jet printing heads is described in more detail in aforementioned U.S. Pat. No. 3,946,398 and in Canadian Pat. No. 1,012,198, issued June 14, 1977.

Also etched into the bottom plate 13 of the print head of FIG. 1 is a pulse trap chamber 31 (reservoir) which is in constant fluid communication with the ink ejecting chamber 11. A single pulse trap chamber is utilized for a multiplicity of ink ejecting chambers in a multi-channel head. Summarizing the more complete disclosure in the aforementioned patents and patent applications, the pressure of ink within the pulse trap chamber 31 is detected through an opening 33 of the top plate 15. The opening 33 is covered with a flexible and expandable material, such as a thin plastic, so that it will bulge inward or outward depending upon the pressure of the ink within the pulse trap chamber 31. A beam 35 is affixed to the top plate 15 in a manner to follow the movement of the membrane. A strain gauge 37 is attached to the beam 35 and the plate 15 in a manner to change its electrical resistivity in accordance with the position of the beam 35 and thus generating a signal proportional to the pressure of ink within the pulse trap chamber 31. A second strain gauge 39 is attached to the top plate 15 in a way that it is unaffected by changing ink pressure within the chamber 31. The second strain gauge 39 is utilized for temperature compensation of the pressure reading obtained from the strain gauge 37.

Summarizing additional material that is better described in the aforementioned patents and patent applications, the ink is supplied to the pulse trap chamber 31 through a path 41 from an ink container of an appropriate type. A valve 43 operated by an electrical signal in a line 45 controls whether the ink passage into the reservoir 31 from the container is opened or closed. An electrical control circuit 47 receives signals from the strain gauges 37 and 39, in a manner described hereinafter with respect to FIGS. 2 and 3, and causes the valve 43 to open or close at appropriate times by emitting proper control signals in the line 45. It is desired for optimum ink ejection operation that the ink pressure within the chamber 31 be maintained within fixed limits and this is controlled by the mechanism just described. The ink container communicating through the passage 41 provides the ink under pressure so that it will readily flow into the chamber 31 when the valve 43 is opened.

It is also desired, as part of the present invention, to maintain the printing head at an optimum operating temperature in a wide variety of ambient temperature positions. For this purpose, a heating element 49 is attached to the bottom side of the bottom plate 13 of the print head. The heater 49 is preferably deposited thereon by known thick film techniques in a zig zag pattern back and forth across the head's bottom surface. As described hereinafter, the resistive heating element 49 is energized through a line 51 from the control circuits 47 in accordance with the temperature of the head monitored by the passive strain gauge 39. It is desirable to maintain the print head above a particular temperature in order to optimize the viscosity of the ink and reduce the possible temperature fluctuation over which other elements must be capable of operating without failure for long periods of time.

Referring to FIG. 2, the improved techniques according to the present invention for monitoring print head temperature and ink pressure will be explained. The strain gauges 37 and 39 are electrically connected in a double bridge circuit, one utilized for developing a signal proportional to ink pressure and the other bridge circuit utilized for developing a signal proportional to the head temperature. The passive strain gauge 39 is utilized as a part of both bridges. A first circuit leg of the double bridge 53 includes the active strain gauge 37 and a series resistance 55 connected between a first conductor junction 57 and a second conductor junction 59. A second bridge leg formed of a series circuit of the passive strain gauge 39 and a resistance 61 is connected between the second junction 59 and a third junction 63. A third bridge leg connected between the first junction 57 and a fourth junction 65 includes a series circuit of a variable resistor 67 and a fixed resistor 69. A fourth leg is formed of a resistance 71 connected between the third junction 63 and the fourth junction 65. A voltage source 73 is connected between the second junction 59 and the fourth junction 65. A signal proportional to ink pressure is then obtained by the voltage between the junction 63 and 57 as transmitted to other circuit elements through conductors 75 and 77.

The second bridge circuit for temperature measurement includes additional elements, one of them being a variable resistance 79 that can be referred to as a fifth bridge leg and extending between the second junction 59 and a fifth junction 81. A sixth bridge leg connected between the junctions 65 and 81 is a fixed resistance 83. A signal proportional to temperature of the print head developes between the third and fifth junctions 63 and 81 and is communicated to other circuit elements through the conductor 77 and a conductor 85. The elements in the first and third bridge legs, including the elements 37, 55, 67 and 69, play no part in developing the temperature signal. Conversely, the elements in the fifth and sixth bridge legs, including the elements 79 and 83, play no part in forming the ink pressure signal.

The ink pressure signal in the lines 75 and 77 is applied to a valve control circuit 91. Initially, each of the lines 75 and 77 are applied through independent series input resistances to a differential amplifier 93 having a low pass filter in its feedback loop formed of a parallel circuit of a capacitor 95 and resistance 97. An output in the line 99 of the differential amplifier 93 carries a signal proportional to the difference in potential of the junctions 57 and 63 of the bridge circuit 53, and is proportional to the ink pressure. This signal is applied to one input of a comparator 101 having a resistance 103 extending from its output 45 to a second input. The second input is also connected to ground potential through a resistance 105. The threshold is set by the comparator 101 at zero volts and the relative values of the resistors 103 and 105 sets the hysteresis of the circuit for turning on and off the valve 43. It will be seen that as the valve 43 is turned on, the ink pressure will build up resulting in the different signal in the line 99 to reduce until it falls below the threshold at which time the output in the line 45 of the comparator 101 changes to its off state. Similarly, as the ink pressure within the chamber 31 (FIG. 1) drops from the ejection of ink droplets from the nozzle 27, the voltage level in the line 99 will increase until it rises above the threshold of the comparator 101 at which time its output in the line 45 switches to its on state to energize the valve 43 and permit ink from the pressurized container to flow into the pulse chamber 31.

The temperature signal in the lines 77 and 85 is applied to a temperature control circuit 111. A unity gain buffer amplifier 113 is connected in the path of the line 77 in order to isolate the temperature circuit 111 and the pressure circuit 91 since they are both connected to that conductor. The signal of the lines 77 and 85 has been applied through individual series resistances to a differential amplifier 115 having a low pass filter in its feedback loop made up of a parallel circuit of a capacitor 117 and a resistance 119. An output of the differential amplifier 115, in a line 121, represents the difference between the voltage levels at the third and fifth junctions 63 and 81 of the bridge circuit 53. The higher the temperature being sensed by the passive strain gauge transducer 39, the higher the voltage in the line 121. The line 121 is then connected through a series resistance to a power amplifier circuit formed of a high impedance amplifier 123 and two transistors 125 and 127. The output of the amplifier 123 is applied through a series resistance to the base element of the transistor 125 while its output at its emitter is connected to the base of the transistor 127. The collectors of each of the transistors 125 and 127 are connected to a +V voltage supply. The emitter of the transistor 127 forms a power output of the amplifier which is connected to the line 51 that drives the head heater 49. A second input of the amplifier 123 is connected through a series resistance with the output line 51 and also through another series resistance to ground potential. The power amplifier circuit converts a millivolt range signal in the line 121 to power in the range of watts to the heating element 49. As the temperature of the head drops, the signal in the line 121 will increase. Similarly, as the head temperature rises, the signal in the line 121 will decrease until it reaches zero potential at a head temperature below which the head is desired not to operate. If the head temperature exceeds that preset temperature, the heating element 49 remains turned off. The signal in the line 121 will go negative by an amount proportional to the difference between the actual head temperature and the control set point. The current to the heater element, however, will be zero.

Referring again to the double bridge circuit 53 of FIG. 2, the resistances 55 and 61 that are placed in series with the strain gauge elements are provided for matching the temperature characteristics of them and will have a zero value if the strain gauge 37 and 39 are perfectly matched as to temperature characteristic. The variable resistance 67 adjusts the pressure output zero voltage between the junctions 57 and 63 and has no affect on the temperature measurement signal. The resistors 71 and 83 are preferably very closely matched, utilizing 1 percent tolerance resistors. The variable resistance 79 adjusts the zero temperature measurement output voltage between the junctions 63 and 81 and has no affect on the pressure measurement output signal. The resistance value of the variable resistor 79 is set to be equal to the sum of the fixed resistor 61 and that of the passive transducer 39 when that transducer is at the predetermined temperature below which the head is desired not to be operated.

In physical configuration, the strain gauges 37 and 39 are positioned on the ink jet head which travels back and forth across the paper or other recording medium upon which the printing is taking place. The rest of the electrical elements shown in FIG. 2 are held stationary, thus requiring a rather lengthy lead lines from the transducers 37 and 39. The possibility exists for noise to be induced in each of these lines and this is undesirable for operating the control circuitry. However, such noise is eliminated by the common mode rejection of the pressure differential amplifier 93 because of the particular circuit connections of the bridge circuit 53. Any noise is induced equally in each of the lines from the strain gauge transducers 37 and 39 and when the signals from these devices are subtracted in the differential amplifier 93, the noise is cancelled. This occurs because of the particular junctions that the voltage 73 is applied to which results from the pressure signal being taken from the other two corner junctions of the pressure bridge. If the voltage supply 73 in the lines 75 and 77 were exchanged as to the junction points to which they connect, the automatic noise cancellation will not occur.

In order to prevent continued operation of a printing device when there is a serious malfunction resulting in an abnormal pressure or temperature reading, limit detectors 141 and 143 are provided. The limit detector 141 receives the difference voltage signal from the line 99 of the pressure sensing circuitry and applies it to one input of each of two comparator amplifiers 145 and 147. The other inputs of these amplifiers are connected to a constant voltage source, one of them connected to a positive voltage and the other to a negative voltage. Therefore, whenever the pressure related voltage in the line 99 goes either above or below these referenced voltages applied to the comparators 145 and 147, one or the other of these comparators will change its output voltage level in one of two amplifier output voltage lines 149 and 151. These lines are applied to an OR gate 153 which developes an output in a line 155 if either of the set voltage thresholds are exceeded by the signal in the line 99. The voltage thresholds are set to be extreme ones that would occur in the line 99 only if there is a serious malfunction of the head that required it to be shut down.

Similarly, a similar operating circuit is connected to monitor the difference voltage in the line 121 at the output of the differential amplifier 115 and the temperature circuit 111. Similarly with the pressure limit detector 141, a signal is emitted in a line 157 from the limit detector 143 if the temperature exceeds upper or lower limits set by the voltages applied to its comparator amplifiers as references. The lines 155 and 157 are applied to an OR gate 159 whose output is the line 23. Therefore, an extremely abnormal temperature or pressure condition causes a signal in the line 23 that may be used to disable the driver circuit 19 of FIG. 1 and shut down other parts of any ink jet printing mechanism.

Referring to FIG. 3, a double bridge structure that is an alternative to the double bridge 53 of FIG. 2 will now be described. In the component and elements of FIG. 3 that correspond to those of FIG. 2 are given the same reference characters with a prime (′) added thereto. The bridge circuit 53′ has an advantage over the bridge 53 in that it is more sensitive but it does utilize additional components.

The main difference in the double bridge 53′ is the inclusion in the third, fourth and sixth bridge leg circuits of transistors 171, 173 and 175, respectively. In each case, the transistor is connected with its emitter on the voltage side and its collector directed to ground potential. Each of the base elements of these transistors are connected to a junction between a Zener diode 177 and a resistance 179. The series circuit of the diode 177 and the series resistance 179 are connected across the voltage source 73′ in order to provide a carefully controlled base voltage for these three transistors. The result is that the current flowing in each of the legs remains substantially constant no matter how the resistance of the transducers 37′ and 39′ change. This assumes, which is the case, that there is very little current flowing in the line 75′, 77′ and 85′ which are connected to inputs of high impedance differential amplifiers.

Therefore, the current flowing through the strain gauge transducers 37′ and 39′ remains constant even though their impedances may change considerably due to changing pressure and temperature at the head. The result is greater sensivity in the voltage output in the line 75′, 77′ and 85′.

Although the various aspects of the present invention have been described with respect to its preferred embodiments, it will be understood that the invention is entitled to protection within the full scope of the appended claims.

I claim:

1. An ink jet printer head pressure control circuit, comprising:

an ink chamber having an orifice through which ink droplets may be expelled, means cooperatively installed in conjunction with said chamber for controllably expelling ink droplets from said chamber through said orifice, means for supplying ink to said chamber, an electrically operated valve controlling said ink supply means between opened and closed states in response to an appropriate electrical signal, means carried by said head for moving with respect thereto a distance proportional to the pressure of the ink within said chamber, a first strain gauge mounted in conjunction with said head and its said pressure moving means in a manner that its electrical impedance varies in proportion to the position of said pressure moving means with respect to the head, thereby giving an electrical indication of the ink pressure within said chamber, a second strain gauge having substantially the same characteristics as the first and positioned in a static manner on said head, an electrical bridge having a first circuit including said first strain gauge connected between first and second junctions, a second circuit including said second strain gauge connected between second and third junctions, a third circuit including a first impedance connected between first and fourth junctions, and a fourth circuit including a second impedance connected between said third and fourth junctions, means for providing an electrical supply voltage between said second and fourth junctions of said bridge, and a high impedance means connected to said bridge at said first and third junctions for opening and closing said valve in accordance with a voltage difference therebetween, whereby the valve is opened and closed as appropriate to maintain the ink pressure within said chamber within a defined limit.

2. The ink jet head circuit according to claim 1 wherein each of the said third and fourth circuits of said bridge comprise means including an active electronic component for maintaining a constant current in each of said circuits as the impedance of said first strain gauge changes from a change of ink pressure, whereby the sensitivity of the pressure measurement is improved.

3. The ink jet head circuit according to claim 1 which additionally comprises means receiving the voltage difference between said first and third junctions for developing a malfunction signal when said voltage exceeds certain preset lower or upper limits, whereby said signal may be utilized to terminate operation of the print head when the ink chamber pressure exceeds the preset lower or upper limits.

4. An ink jet printer head pressure control circuit, comprising:

first means responsive to changing ink pressure within the printer head and to changing temperature for altering its electrical conductivity in proportion thereto, second means passively positioned on said printer head so as to be unaffected by changing ink pressure for altering its electrical conductivity in proportion to its changing temperature with substantially the same characteristics as said first means, an electrical bridge having a first circuit including said first means connected between first and second junctions, a second circuit including said second means connected between second and third junctions, a third circuit connected between first and fourth junctions, and a fourth circuit connected between said third and fourth junctions, means for providing an electrical supply voltage between said second and fourth junctions of said bridge, and means connected to said bridge at said first and third junctions for utilizing the value of voltage difference therebetween, thereby to provide a signal proportional to ink pressure.

5. An ink jet printer head pressure and temperature control circuit, comprising:

an ink chamber having an orifice through which ink droplets may be expelled, means cooperatively installed in conjunction with said chamber for controllably expelling ink droplets from said chamber through said orifice, means for supplying ink to said chamber, an electrically operated valve controlling said ink supply means between opened and closed states in response to an appropriate electrical signal, means carried by said head for moving with respect thereto a distance proportional to the pressure of the ink within said chamber, a first strain gauge mounted in conjunction with said head and its said pressure moving means in a manner that its electrical impedance varies in proportion to the position of said pressure moving means with respect to the head, thereby giving an electrical indication of the ink pressure within said chamber, said first strain gauge additionally being characterized by an impedance that varies as a function of its temperature, a second strain gauge having substantially the same characteristics as the first and positioned in a static manner on said head, an electrical heating element attached to said ink jet head, a double electrical bridge having a first circuit including said first strain gauge connected between first and second junctions, a second circuit including said second strain gauge connected between second and third junctions, a third circuit including a first impedance connected between first and fourth junctions, a fourth circuit including a second impedance connected between said third and fourth junctions, a fifth circuit including a third impedance connected between said second junction and a fifth junction, and a sixth circuit including a fourth impedance connected between said fourth and fifth junctions, a high impedance means connected to said bridge at said first and third junctions for opening and closing said valve in accordance with a voltage difference therebetween, whereby the valve is opened and closed as appropriate to maintain the ink pressure within said chamber within a defined limit, and a high impedance means connected to said bridge at said third and fifth junctions for developing a signal proportional to the voltage therebetween to drive said ink jet head heating element, whereby the temperature of the ink within the head is controlled.

6. The ink jet head circuit according to claim 5 wherein the total impedance of said fourth and sixth circuits is substantially equal, and further wherein the total impedance of said second and fifth circuits is substantially equal when the second strain gauge is at a particular temperature, whereby the ink jet printer head is heated by said heating element when the head is less than said particular temperature.

7. The ink jet head circuit according to claim 5 wherein each of said third, fourth and sixth circuits of said double bridge comprise means including an active electronic component for maintaining a constant current in each of said circuits as the impedance of said first and second strain gauge changes from a change of ink pressure or head temperature, whereby the sensitivity of the temperature and pressure measurements are improved.

8. The ink jet head circuit according to claim 5 which additionally comprises means receiving the voltage difference between said first and third junctions and the voltage difference between said third and fifth junctions for developing a malfunction signal when either of said voltage differences exceeds certain preset lower or upper limits, whereby said signal may be utilized to terminate operation of the print head when the ink chamber pressure or temperature exceeds the preset lower or upper limits.

9. An ink jet printer head pressure and temperature control circuit, comprising:

first means responsive to changing ink pressure within the printer head and to changing temperature for altering its electrical conductivity in proportion thereto, second means passively positioned on said printer head so as to be unaffected by changing ink pressure for altering its electrical conductivity in proportion to its changing temperature with substantially the same characteristics as said first means, a first bridge circuit including said first and second means for developing a signal proportional to the pressure of said ink, and a second bridge circuit including said second means but excluding said first means for developing a signal proportional to the temperature of the head.

* * * * *